(12) United States Patent
Yang

(10) Patent No.: US 7,705,501 B2
(45) Date of Patent: Apr. 27, 2010

(54) COMMON CONSTRUCTION OF COAXIAL I/O DUAL ELECTRO-MECHANICAL UNITS

(76) Inventor: Tai-Her Yang, 6F-5 No. 250, Sec. 4, Chung Hsiao E. Rd., Taipei (TW)

( * ) Notice: Subject to any disclaimer, the term of this patent is extended or adjusted under 35 U.S.C. 154(b) by 512 days.

(21) Appl. No.: 11/486,210

(22) Filed: Jul. 14, 2006

(65) Prior Publication Data
US 2008/0012441 A1    Jan. 17, 2008

(51) Int. Cl.
*H02K 7/10* (2006.01)
*H02K 16/02* (2006.01)
(52) U.S. Cl. .................... 310/112; 310/75 R; 310/114
(58) Field of Classification Search ............. 310/75 R, 310/112, 113, 114
See application file for complete search history.

(56) References Cited
U.S. PATENT DOCUMENTS

| | | | | |
|---|---|---|---|---|
| 3,757,149 A | * | 9/1973 | Holper | 310/114 |
| 5,212,418 A | * | 5/1993 | Mason | 310/114 |
| 5,780,950 A | * | 7/1998 | Yang | 310/114 |
| 5,814,913 A | * | 9/1998 | Ojima et al. | 310/112 |
| 6,761,542 B2 | * | 7/2004 | Ojima et al. | 417/410.4 |

FOREIGN PATENT DOCUMENTS

DE        10219922 A1  *  11/2003

* cited by examiner

*Primary Examiner*—Tran N Nguyen
(74) *Attorney, Agent, or Firm*—Bacon & Thomas, PLLC

(57) ABSTRACT

A common construction is made up of two rotation parts each including a revolving electro-mechanical unit arranged in parallel and an output of both rotation parts being made coaxial by means of a transmission disposed on each side of the common construction, the construction being arranged between two wheels to mitigate the impacts when wheels on either side are subject to force.

10 Claims, 3 Drawing Sheets

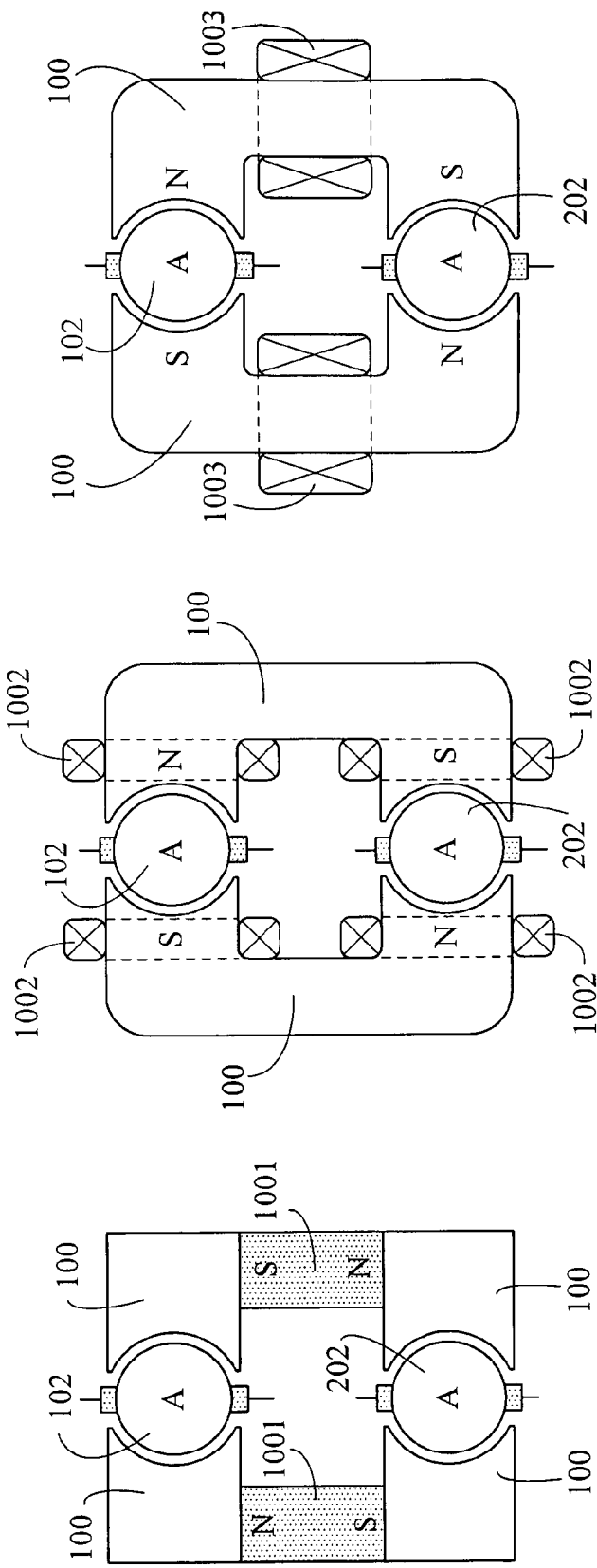

COMMON CONSTRUCTION OF COAXIAL I/O DUAL ELECTRO-MECHANICAL UNITS

BACKGROUND OF THE INVENTION (a) Field of the Invention

The present invention is related to a common construction to accommodate dual electro-mechanical units arranged in parallel and with co-axial input/output (I/O), and more particularly to one designed for correcting the defect that a carrier with wheels on both sides respectively driven by an electro-mechanical unit is comparatively heavy and causes greater impacts upon the wheels on either single side of the carrier when subject to force, by having the present invention disposed between the wheels on both sides of the carrier.

(b) Description of the Prior Art

Whereas a conventional carrier driven by dual electro-mechanical units driven carrier usually operates by having an independent motor to drive the vehicle through individual reduction gear or having the individual rim motor directly drive wheels on both sides, the weight of the motor is comparatively heavy with the distribution profile of its center of gravity similar to a laterally positioned dumbbell that tends to have both ends heavier. Therefore, the conventional carrier is found to have the drawback of being vulnerable to comparatively greater vibrations when the wheels on either side are subject to force.

SUMMARY OF THE INVENTION

The primary purpose of the present invention is to provide a common construction to accommodate two rotation parts each from a revolving electro-mechanical unit arranged in parallel such that the outputs of both rotation parts are made coaxial by means of a transmission disposed on each side of the common construction, the construction accommodating both electro-mechanical units in parallel and being innovatively arranged between two wheels to mitigate the impacts when wheels on either side are subject to force.

BRIEF DESCRIPTION OF THE DRAWINGS

FIG. 5 is a schematic view showing another preferred embodiment yet of the present invention, wherein the preferred embodiment illustrated in FIG. 3 is applied in an electric machinery of DC rectifier type and is supplied with common magnetic poles of permanent magnet, a series common magnetic path, and individual magnetic poles.

FIG. 6 is a schematic view showing another preferred embodiment yet of the present invention, wherein the preferred embodiment illustrated in FIG. 3 is applied in an electric machinery of DC rectifier type and is supplied with individual winding excitement magnetic poles and a series common magnetic path.

FIG. 7 is a schematic view showing another preferred embodiment yet of the present invention, wherein the preferred embodiment illustrated in FIG. 3 is applied in an electric machinery of DC rectifier type and is supplied with common winding excitement magnetic poles permanent magnet and a series common magnetic path.

DETAILED DESCRIPTION OF THE PREFERRED EMBODIMENTS

The present invention is related to a common construction characterized in that the construction accommodates two rotation parts, each including a revolving electro-mechanical unit arranged in parallel and the outputs of both rotation parts being made coaxial by means of a transmission disposed on each side of the common construction, the construction being arranged to accommodate both electro-mechanical units in parallel and innovatively situated between two wheels to mitigate the impacts when wheels on either side are subject to force.

Figure 2:
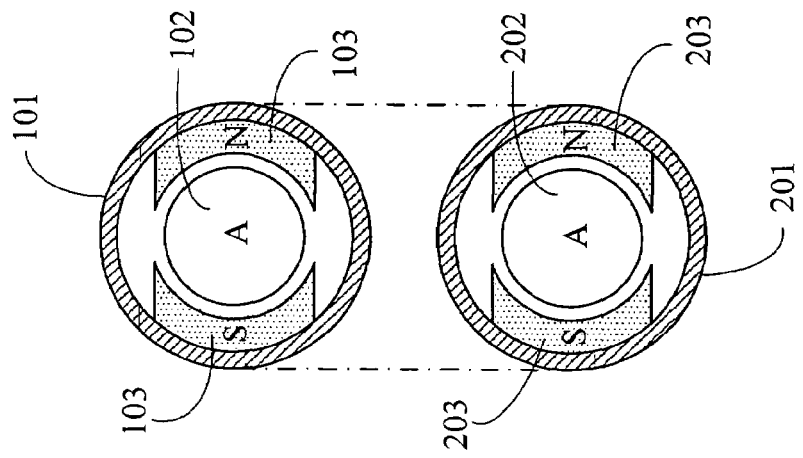
FIG. 2 is a cross-sectional view of A-A' as illustrated in FIG. 1.
Figure 1:
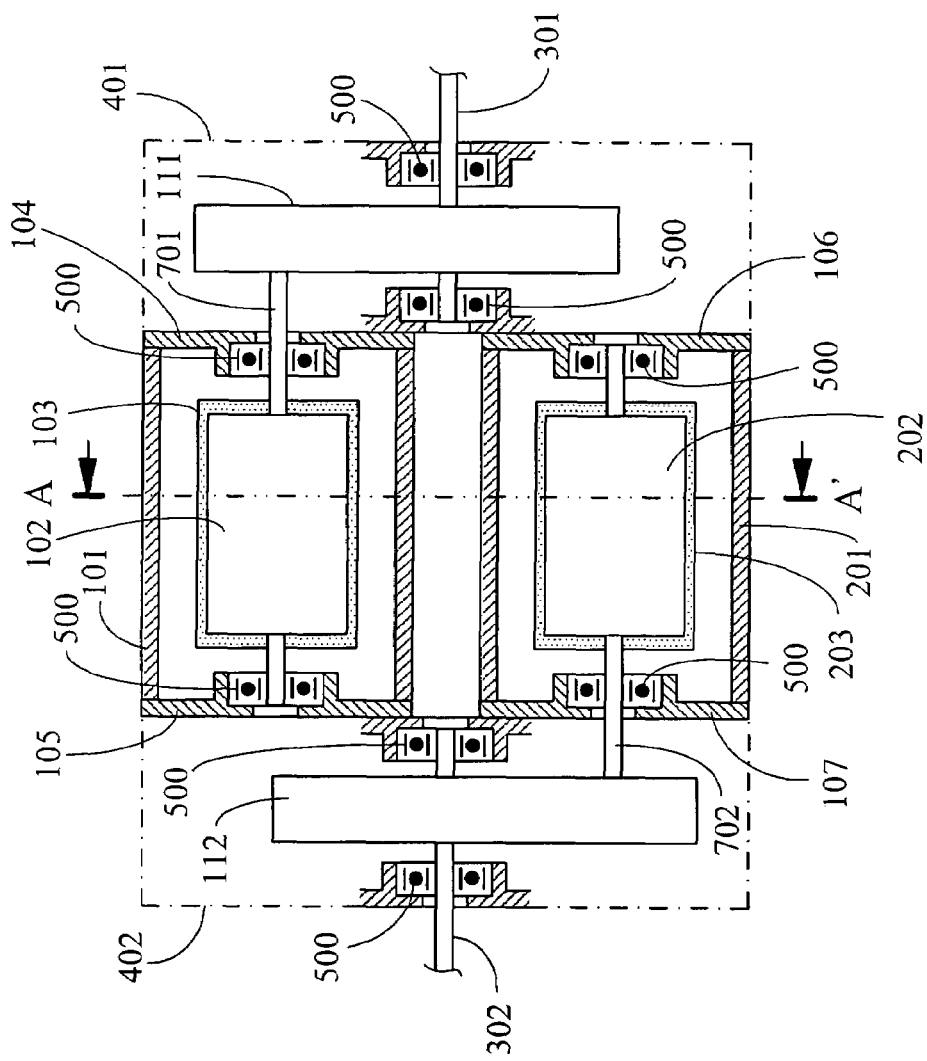
FIG. 1 is a schematic view of a primary construction of a preferred embodiment of the present invention.

Referring to the preferred embodiment illustrated in FIGS. 1 and 2, a common construction to accommodate two electro-mechanical units arranged in parallel and indicating the coaxial I/O includes one or a plurality of a first electro-mechanical rotation part structure 102, one or a plurality of a second electro-mechanical rotation part structure 202, one or a plurality of the first electro-mechanical magnetic field structure 103, one or a plurality of the second electro-mechanical magnetic field structure 203, associate casings 401, 402, and a bearing 500 to respectively constitute both electro-mechanical units 101, 201, wherein, a first transmission 111 is disposed to the casing 401 on one side to receive the drive force from an output end 701 of the rotation part structure 102 of the first electro-mechanical unit 101 and to output the drive force through an output axle 301 of the first transmission 111;

a second transmission 112 is disposed to the casing 402 on the other side to receive the drive force from an output end 702 of the rotation part structure 202 of the second electro-mechanical unit 201 and to output the drive force through an output axle 302 of the second transmission 112;

Both of the output axle 301 of the first transmission 111 and the output axle 302 of the second transmission indicate coaxial structure to respectively drive loads on both sides.

The present invention is essentially comprised of:

Electro-mechanical units 101 and 201: each related to a DC brush electro-mechanical structure provided with magnetic poles of excitement windings, or magnetic poles of permanent magnet, and armature of rectifier type; or related to a DC brush-less electro-mechanical structure provided with permanent magnet type or magnetic inertia type rotor; or related to a electro-mechanical structure provided with AC excitement winding type magnetic filed structure, and AC induction cage rotor, or permanent magnet rotor, or magnetic inertia rotor; the electro-mechanical unit in its normal statue provides functions as a motor to engage in synchronous or asynchronous revolution operation, and if and when required, provides a revolving electric machinery functioning as a generator;

Transmissions 111 and 112: related to a variable or invariable transmission comprised of gear set, friction gear set, conveyer gear set, chain gear set, and steel conveyer gear set; or related to a fluid coupled variable transmission, or related to a magnetic vortex coupled variable transmission, or a conveyer variable transmission (CVT);

Output axles 301 and 302: comprised of axle or gear type revolving transmission, wherein revolving kinetics are outputted from both output ends 701, 702 respective from both rotation part structures 102, 202 of the electro-mechanical units 101, 201 to drive both output axles 301, 302 through the transmission 111 or 112; both output axles 301, 302 are capable of directly driving the load or driving the load through a relay transmission, e.g., a CV joint, clutch, or other power coupling device, or a variable transmission;

Casings 401 and 402: made of metallic or plastic material to be incorporated to both sides of the electro-mechanical units sharing the same construction to accommodate both transmissions 111, 112 and bearings of both output axles 301, 302; and Bearing 500: related to a sleeve, roller, ball bearing or other structure to bear the revolving axle.

Figures 3, 4:
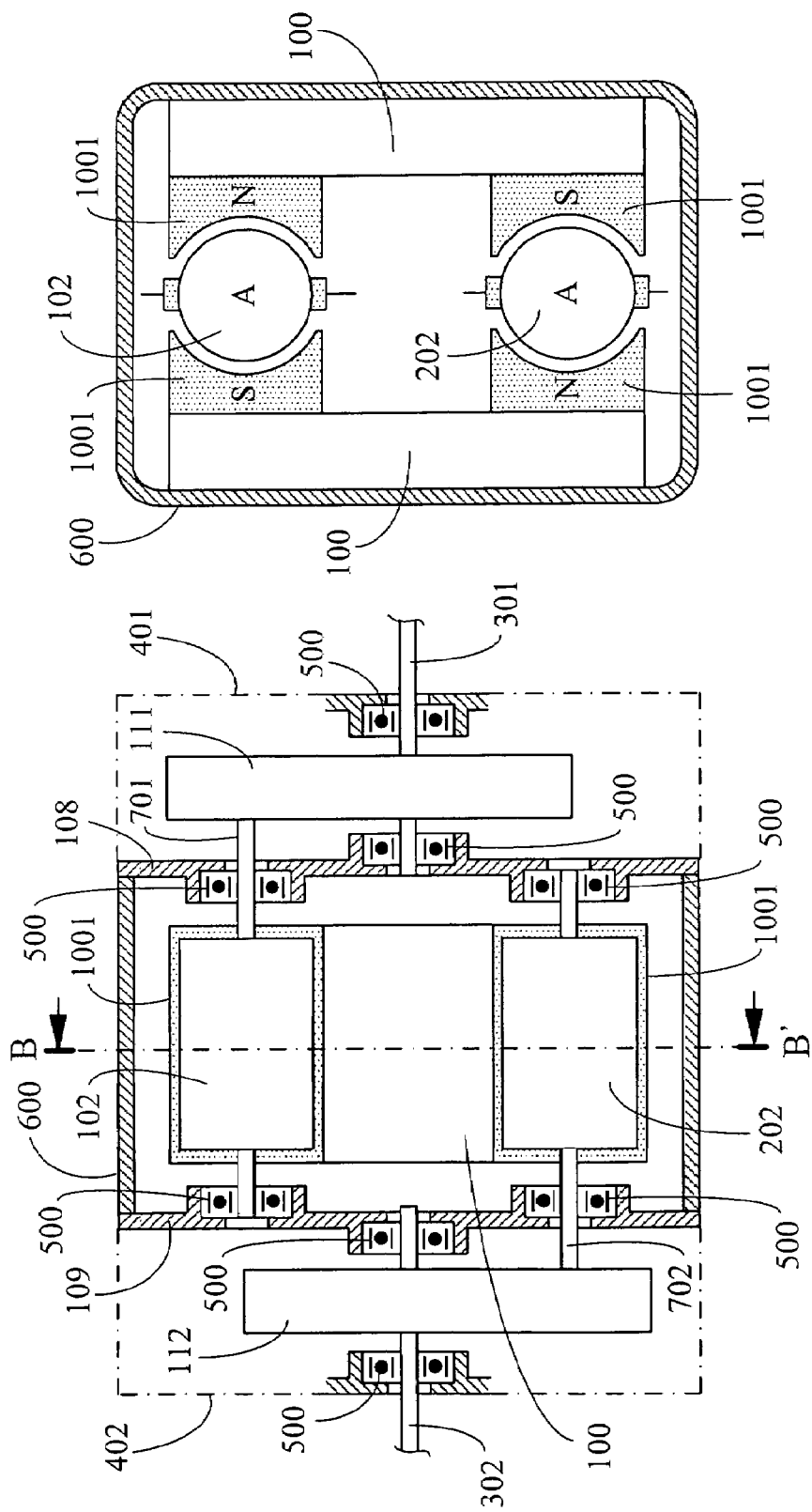
FIG. 3 is a schematic structural view showing a preferred embodiment of the present invention, wherein each of both electro-mechanical units is provided with an independent construction of rotation part of the electro-mechanical unit and share a common magnetic path in series.
FIG. 4 is a cross-sectional view of B-B' as illustrated in FIG. 3.

As illustrated in FIGS. 3 and 4, a preferred embodiment of a common construction for two electro-mechanical units arranged in parallel and indicating coaxial I/O of the present invention relates to a common structure of an electro-mechanical unit 600 comprised of one or a plurality of a rotation part structure 102 of the first electro-mechanical unit, one or a plurality of the rotation part structure 202 of the second electro-mechanical unit 202, one or a plurality of a magnetic field structure of the first electro-mechanical unit constituted by the permanent magnet type magnetic poles 1001, and one of a plurality of a magnetic field structure of the second electro-mechanical unit constituted by the permanent magnet type magnetic poles 1001, one or a plurality of series common magnetic path structure 100 and associate casings and a bearing, wherein, The casing 401 disposed on one side is provided for mounting the transmission 111 to receive drive force from the output end 701 of the first electro-mechanical rotation part structure 102 and to output the same through the output axle 301 of the first transmission 111;

The casing 402 disposed on the other end is provided for mounting the second transmission 112 to receive drive force from the output end 702 of the second electro-mechanical rotation part structure 202 and to output the same through the output axle 302 of the first transmission 112.

Both of the output axle 301 of the first transmission 111 and the output axle 302 of the second transmission 112 indicate coaxial structure to respectively drive loads on both sides.

The preferred embodiment is essentially comprised of:

Common electro-mechanical unit 600: it is comprised of one or a plurality of a rotation part structure 102 of the first electro-mechanical unit, one or a plurality of the rotation part structure 202 of the second electro-mechanical unit 202, one or a plurality of a magnetic field structure of the first electro-mechanical unit constituted by the permanent magnet type magnetic poles 1001, and one of a plurality of a magnetic field structure of the second electro-mechanical unit constituted by the permanent magnet type magnetic poles 1001, one or a plurality of series common magnetic path structure 100 and associate casings and a bearing;

Transmissions 111 and 112: related to a variable or invariable transmission comprised of gear set, friction gear set, conveyer gear set, chain gear set, and steel conveyer gear set; or related to a fluid coupled variable transmission, or related to a magnetic vortex coupled variable transmission, or a conveyer variable transmission (CVT) to be selected as required;

Output axles 301 and 302: comprised of axle or gear type revolving transmission, wherein revolving kinetics are outputted from both output ends 701, 702 respective from both rotation part structures 102, 202 of the electro-mechanical units 101, 201 to drive both output axles 301, 302 through the transmission 111 or 112; both output axles 301, 302 are capable of directly driving the load or driving the load through a relay transmission, e.g., a CV joint, clutch, or other power coupling device, or a variable transmission;

Casings 401 and 402: made of metallic or plastic material to be incorporated to both sides of the electro-mechanical units sharing the same construction to accommodate both transmissions 111, 112 and bearings of both output axles 301, 302; and Bearing 500: related to a sleeve, roller, ball bearing or other structure to bear the revolving axle.

The preferred embodiment illustrated in FIGS. 1 to 4 is characterized in that both output axles adapted to both sides of the casing indicate coaxial output; one of the following options may be selected for the layout of the associate casing and transmission and the determination of the relative positions between two rotation part structures 102, 202 of both electro-mechanical units:

(1) Having at least two revolving axles respectively of both electro-mechanical rotation part structures 102 and 202 arranged in parallel to each other while having the positions of axle centers of both revolving axles to indicate horizontal or approximately horizontal status;

(2) Having at least two revolving axles respectively of both electro-mechanical rotation part structures 102 and 202 arranged in parallel to each other while having the positions of axle centers of both revolving axles to indicate vertical or approximately vertical status;

(3) Having at least two revolving axles respectively of both electro-mechanical rotation part structures 102 and 202 arranged in parallel to each other while having the positions of axle centers of both revolving axles to be at different heights; or (4) Having at least two revolving axles respectively of both electro-mechanical rotation part structures 102 and 202 to be two revolving electric machineries independent from each other while being incorporated to share the same construction as illustrated in FIGS. 1 and 2 either by locking or soldering taking advantage of the casings 401, 402 and the end casing of the transmissions 111, 112.

Furthermore, the common construction for dual electro-mechanical units arranged in parallel and indicating the coaxial I/O of the present invention may be made in the construction of each of having both electro-mechanical units respectively provided with the independent electro-mechanical rotation part structures 102, 202, and a common series magnetic path structure 100 to be incorporated either by locking or soldering to both casings 401, 402 and the end casings of both transmission 111, 112 to constitute a common electro-mechanical unit 600.

In case of the DC brush electric machinery provided with excitement winding, magnetic poles of permanent magnet and armature of rectifier type, the series common magnetic path structure 100 of the common electro-mechanical unit 600 as illustrated in FIG. 3 includes any of the following types:

(1) The common electro-mechanical unit 600 includes is provided with individual magnetic poles of permanent magnet and series common magnetic field structure;

(2) The common electro-mechanical unit 600 is provided with common magnetic poles of permanent magnet, series common magnetic path structure and individual magnetic poles;

(3) The common electro-mechanical unit 600 is provided with individual excitement winding magnetic poles and series common magnetic path structure;

(4) The common electro-mechanical unit 600 is provided with common excitement winding magnetic poles and series common magnetic path structure.

FIG. 4 is a cross-sectional view of B-B' as illustrated in FIG. 3.

As illustrated in FIG. 4, the series common magnetic path structure 100 is provided with permanent magnet type magnetic poles 1001 of different polarities to be respectively coupled to both electro-mechanical rotation part structures of 101 and 202 while the series common magnetic path structure 100 is provided to be incorporated to the rear of the permanent magnet type magnetic poles 1001 respectively coupled to different electro-mechanical rotation part structures 102 and 202 for the series common magnetic path structure 100, permanent magnet type magnetic poles 1001 and both electro-mechanical rotation part structures 102, 202 to constitute a series annular magnetic path.

FIG. 5 shows a schematic view of a preferred embodiment of applying the preferred embodiment illustrated in FIG. 3 in an electric machinery of DC rectifier type that is provided with common magnetic poles of permanent magnet, series common magnetic path structure, and individual magnetic poles.

In FIG. 5, the series common magnetic path structure 100 is provided with permanent magnet type magnetic poles 1001 of different polarities to be respectively coupled to the series common magnetic path structure 100 while one end of the individual series common magnetic path structure 100 is provided for constituting magnetic poles to be respectively coupled to rotation part structures 102 and 202 from different electric machineries for the permanent magnet type magnetic poles 1001, the series common magnetic path structure 100, and electro-mechanical rotation part structures to constitute a series annular magnetic path.

FIG. 6 shows a schematic view of a preferred embodiment of applying the preferred embodiment illustrated in FIG. 3 in an electric machinery of DC rectifier type that is provided with individual excitement winding magnetic poles of and series common magnetic path structure.

In FIG. 6, those magnetic poles constituted by both ends of the series common magnetic path structure 100 are excited by an individual excitement winding 1002 disposed with individual magnetic poles and are respectively coupled to rotation part structures 102 and 202 from different electric machineries for the series common magnetic path structure 100 and electro-mechanical rotation part structures 102, 202 o constitute a series annular magnetic path.

FIG. 7 shows a schematic view of a preferred embodiment of applying the preferred embodiment illustrated in FIG. 3 in an electric machinery of DC rectifier type that is provided with common excitement winding magnetic poles and series common magnetic path structure.

In FIG. 7, the series common magnetic path structure 100 are excited by a common excitement winding 1003, and those magnetic poles constituted by both ends of the series common magnetic path structure 100 are excited by the individual excitement winding 1002 disposed with individual magnetic poles and are respectively coupled to rotation part structures 102 and 202 from different electric machineries for the series common magnetic path structure 100 and electro-mechanical rotation part structures 102, 202 to constitute a series annular magnetic path.

The dual parallel electro-mechanical common structure indicating coaxial I/O of the present invention is similar to the conventional drive installation when applied in practical use, and an optional clutch may be adapted to the power chain to control whether the power transmission between the electric machinery and the load to be executed or not; or an optional braking installation may be adapted to control the braking function.

As described above, the dual parallel electro-mechanical common structure having a coaxial I/O of the present invention is adapted so that its center gravity is centered between two wheels to reduce the impacts of vertical vibration on each side of the carrier.

The invention claimed is:

1. A dual parallel electro-mechanical structure with a coaxial input/output (I/O), comprising two rotation parts each including a rotating electro-mechanical unit, the electro-mechanical units being arranged in parallel and having drive force outputs that are made coaxial by means of a transmission disposed on each side of a common structure supporting said electro-mechanical units, the common structure being adapted to be situated between two wheels to mitigate the impact when wheels on either side are subject to force, wherein:

a first of the electro-mechanical units includes at least one first electro-mechanical field structure; at least one second electro-mechanical rotation part structure; and a first bearing for an output of the electro-mechanical unit, a drive force of said first electro-mechanical unit being output through a first transmission and a first output axle, a second of the electro-mechanical units including at least one second electro-mechanical rotation part structure; at least one second electro-mechanical magnetic field structure; and a second bearing for an output of the second electro-mechanical unit; and at least one casing, a drive force of said second electro-mechanical unit being output through a second transmission and a second output axle, wherein:

the first transmission is disposed on one side of the first casing to receive the drive force from an output end of the first rotation part structure and to output the drive force through the first output axle supported by the first bearing;

the second transmission is disposed on one side of the second casing on a side of the common structure opposite the side on which the first transmission is disposed, the second transmission being disposed to receive the drive force from an output end of the second rotation part structure and to output the drive force through the second output axle that is coaxial with the first output axle and on an opposite side of the common structure from the first output axle.

2. The dual parallel electro-mechanical structure claimed in claim 1, wherein said first and second magnetic field structures include permanent magnet poles and at least one magnetic path structure that is common to the first and second magnetic field structures.

3. The dual parallel electro-mechanical structure claimed in claim 1, wherein said first and second electro-mechanical rotation part structures include mutually parallel axes.

4. The dual parallel electro-mechanical structure claimed in claim 1, wherein the two rotating electro-mechanical units rotate independently but share a common casing.

5. The dual parallel electro-mechanical structure claimed in claim 1, wherein the first and second electro-mechanical units are respectively provided with independent electro-mechanical rotation part structures and a common series magnetic path structure to constitute a dual parallel electro-mechanical structure having one of the following configurations:
  (1) the first and second magnetic field structures include respective individual permanent magnet poles and said common series magnetic path structure is shared by the permanent magnet poles;
  (2) the first and second magnetic field structures include shared permanent magnets shared by said common series magnetic path structure, and individual magnetic poles;
  (3) the common electro-mechanical unit is provided with individual excitement windings extending around said common series magnetic path structure to form individual magnetic poles; and
  (4) the dual parallel electro-mechanical structure is provided with shared excitement windings extending around said series magnetic path structure to form individual magnetic poles.

6. The dual parallel electro-mechanical structure claimed in claim 2, wherein said permanent magnet type magnetic poles have different polarities respectively coupled to the at least one common magnetic path structure while one end of the at least one common magnetic path structure is respectively coupled to rotation part structures from different ones of the first and second electro-mechanical units to provide a series annular magnetic path.

7. The dual parallel electro-mechanical structure claimed in claim 2, wherein said permanent magnet type magnetic poles have different polarities respectively coupled to the at least one common magnetic path structure, magnetic poles at one end of the at least one common magnetic path structure being respectively coupled to rotation part structures different ones of the first and second electro-mechanical units to provide a series annular magnetic path.

8. The dual parallel electro-mechanical structure claimed in claim 2, wherein magnetic poles constituted by both ends of the at least one magnetic path structure are excited by individual excitement windings with extending around said individual magnetic poles and are respectively coupled to rotation part structures from different ones of the first and second electro-mechanical units to provide a series annular magnetic path.

9. The dual parallel electro-mechanical structure claimed in claim 2, wherein the first and second electro-mechanical units are excited by a common excitement winding, and the magnetic poles constituted by both ends of the series common magnetic path structure are excited by shared excitement windings and are respectively coupled to rotation part structures from different ones of the first and second electro-mechanical units to provide a series annular magnetic path.

10. The dual parallel electro-mechanical structure claimed in claim 1, wherein said first and second magnetic field structures include individual excitement windings.

* * * * *